United States Patent
Zhang et al.

(10) Patent No.: US 10,213,772 B2
(45) Date of Patent: Feb. 26, 2019

(54) MIDDLE DISTILLATE HYDROCRACKING CATALYST CONTAINING ZEOLITE USY WITH ENHANCED ACID SITES

(71) Applicants: Yihua Zhang, Albany, CA (US); Theodorus Ludovicus Michael Maesen, Moraga, CA (US); Andrew Rainis, Walnut Creek, CA (US); Bao Quoc Le, Pittsburg, CA (US)

(72) Inventors: Yihua Zhang, Albany, CA (US); Theodorus Ludovicus Michael Maesen, Moraga, CA (US); Andrew Rainis, Walnut Creek, CA (US); Bao Quoc Le, Pittsburg, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/683,435

(22) Filed: Apr. 10, 2015

(65) Prior Publication Data
US 2016/0296922 A1 Oct. 13, 2016

(51) Int. Cl.
| | |
|---|---|
| B01J 29/16 | (2006.01) |
| B01J 35/00 | (2006.01) |
| B01J 35/02 | (2006.01) |
| B01J 35/10 | (2006.01) |
| B01J 37/00 | (2006.01) |
| C10G 47/20 | (2006.01) |
| B01J 37/02 | (2006.01) |

(52) U.S. Cl.
CPC ........... *B01J 29/166* (2013.01); *B01J 35/002* (2013.01); *B01J 35/023* (2013.01); *B01J 35/108* (2013.01); *B01J 35/1023* (2013.01); *B01J 35/1061* (2013.01); *B01J 37/0009* (2013.01); *C10G 47/20* (2013.01); *B01J 37/0207* (2013.01); *B01J 2229/20* (2013.01)

(58) Field of Classification Search
CPC ... B01J 29/04; B01J 29/08; B01J 29/10; B01J 29/106; B01J 29/166; B01J 37/0207; B01J 37/0236; B01J 37/04; B01J 37/08; C10G 47/16; C10G 47/18; C10G 47/20
See application file for complete search history.

(56) References Cited

U.S. PATENT DOCUMENTS

| | | |
|---|---|---|
| 5,954,944 A | 9/1999 | Zhang et al. |
| 6,860,986 B2 | 3/2005 | Timken et al. |
| 2004/0092384 A1* | 5/2004 | Timken ................. B01J 29/084 502/64 |
| 2011/0086755 A1* | 4/2011 | Iino ....................... B01J 29/076 502/66 |
| 2011/0108459 A1 | 5/2011 | Simon et al. |
| 2012/0205286 A1 | 8/2012 | Francis et al. |

FOREIGN PATENT DOCUMENTS

| | | |
|---|---|---|
| CN | 1253860 A | 5/2000 |
| CN | 1253989 A | 5/2000 |
| CN | 103100403 A | 5/2013 |
| WO | 2006070090 A1 | 7/2006 |

OTHER PUBLICATIONS

Gorte, R.J. (1999). Catalysis Letters, 62, 1-13.*
Hensen, E.J.M. et al. (2010). Journal of Physical Chemistry C, 114, 8363-8374.*
Zeolite Y, Zeolyst International, http://www.zeolyst.com/our-products/standard-zeolite-powders/zeolite-y.aspx.
Timken, et al., New Generation of Isocracking Catalysts, Block 2, Form 6 pater.
Zhang, et al., Middle Distillate Hydrocracking Catalyst Containing Highly a Stabilized Y Zeolite With Enhanced Acid Site Distribution, U.S. Appl. No. 14/529,794, 26 pages, filed Oct. 31, 2014.

* cited by examiner

*Primary Examiner* — Brian A McCaig
(74) *Attorney, Agent, or Firm* — Susan M. Abernathy; Mark L. Warzel

(57) ABSTRACT

A hydrocracking catalyst is provided comprising: a) greater than 10 wt % of a zeolite USY having: i. a total OD acidity of 0.350 to 0.650 mmol/g; ii. an ASDI between 0.05 and 0.15; iii. a BET surface area greater than 600 $m^2/g$; iv. a SAR greater than 10; v. less than 45 vol % of pores greater than 2 nm; b) a support; and c) at least one metal selected from the group consisting of elements from Group 6 and Groups 8 through 10 of the Periodic Table. A process for hydrocracking using a hydrocracking catalyst to produce middle distillates is provided. A method for making a hydrocracking catalyst is also provided.

19 Claims, No Drawings

MIDDLE DISTILLATE HYDROCRACKING CATALYST CONTAINING ZEOLITE USY WITH ENHANCED ACID SITES

TECHNICAL FIELD

This application is directed to a hydrocracking catalyst, a process for hydrocracking a hydrocarbonaceous feedstock, and a method for making a hydrocracking catalyst.

BACKGROUND

Improved hydrocracking catalysts and processes for using them and making them are needed. Earlier hydrocracking catalysts have not provided the desired levels of activity and selectivity that are required to optimize the production of middle distillates.

SUMMARY

This application provides a hydrocracking catalyst comprising:
 a. greater than 10 wt % of a zeolite USY having:
  i. a total OD acidity of 0.350 to 0.650 mmol/g;
  ii. an ASDI between 0.05 and 0.15;
  iii. a BET surface area greater than 600 m$^2$/g;
  iv. a SAR greater than 10;
  v. less than 45 vol % of pores greater than 2 nm;
 b. a support; and
 c. at least one metal selected from the group consisting of elements from Group 6 and Groups 8 through 10 of the Periodic Table;
wherein the hydrocracking catalyst is conducive to making middle distillates.

This application also provides a process for hydrocracking a hydrocarbonaceous feedstock, comprising contacting the hydrocarbonaceous feedstock with a hydrocracking catalyst under hydrocracking conditions to produce a hydrocracked effluent that comprises middle distillates; wherein the hydrocracking catalyst comprises:
 a. greater than 10 wt % of a zeolite USY having a total OD acidity of 0.350 to 0.650 mmol/g and an ASDI between 0.05 and 0.15;
 b. a support; and
 c. at least one metal selected from the group consisting of elements from Group 6 and Groups 8 through 10 of the Periodic Table.

This application also provides a method for making a hydrocracking catalyst, comprising:
 mixing together a zeolite USY having a total OD acidity of 0.350 to 0.650 mmol/g and an ASDI between 0.05 and 0.15; one or more support constituents; and enough liquid to form an extrudable paste;
 b. extruding the extrudable paste to form an extrudate base;
 c. impregnating the extrudate base with a metal impregnation solution containing at least one metal selected from the group consisting of elements from Group 6 and Group 8 through 10 of the Periodic Table to make a metal-loaded extrudate;
 d. post-treating the metal-loaded extrudate by subjecting the metal-loaded extrudate to drying and calcination; wherein the hydrocracking catalyst is conducive to making middle distillates and has an improved property compared to a comparable hydrocracking catalyst comprising a different zeolite USY with a lower total OD acidity of at most 0.34 mmol/g or a higher ASDI of 0.16 or greater; and wherein the improved property is selected from the group of:
 i. a higher selectivity for producing a hydrocracked effluent having a TBP of 250-550° F. (121-288° C.),
 ii. an activity that is 7° F. (4° C.) to 30° F. (17° C.) higher, and
 iii. a combination thereof The present invention may suitably comprise, consist of, or consist essentially of, the elements in the claims, as described herein.

GLOSSARY

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins(naphthenes) into non-cyclic branched paraffins.

"Cut point" refers to the temperature on a True Boiling Point ("TBP") curve at which a predetermined degree of separation is reached.

"TBP" refers to the boiling point of a hydrocarbonaceous feed or product, as determined by ASTM D2887-13.

"Hydrocarbonaceous" means a compound or substance that contains hydrogen and carbon atoms, and which can include heteroatoms such as oxygen, sulfur, or nitrogen.

"Middle distillates" include products having cut points from 300° F. (149° C.) to 700° F. (371° C.). Middle distillates can include jet, kerosene, and diesel. Some typical naphthas and middle distillates for the North American market include the following:

TABLE 1

| Products | Typical Cut Points, ° F. (° C.) for North American Market |
|---|---|
| Light Naphtha | C$_5$-180 (C$_5$-82) |
| Heavy Naphtha | 180-300 (82-149) |
| Jet | 300-380 (149-193) |
| Kerosene | 380-530 (193-277) |
| Diesel | 530-700 (277-371) |

"Finished catalyst" refers to the hydrocracking catalyst composition comprising all of its components and after all of the processing and any post-processing steps used to manufacture it.

"LHSV" means liquid hourly space velocity.

"SCF/B" refers to a unit of standard cubic foot of gas (e.g., nitrogen, hydrogen, air, etc) per barrel of hydrocarbonaceous feed.

"SiO$_2$/Al$_2$O$_3$ mole ratio (SAR) is determined by inductively coupled plasma (ICP) elemental analysis. A SAR of infinity means there is no aluminum in the zeolite, i.e., the mole ratio of silica to alumina is infinity. In that case, the zeolite is comprised of essentially all silica.

"Zeolite USY" refers to ultra-stabilized Y zeolite. Y zeolites are synthetic faujasite (FAU) zeolites having a SAR of 3 or higher. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor.

"Periodic Table" refers to the version of the IUPAC Periodic Table of the Elements dated Jun. 22, 2007, and the numbering scheme for the Periodic Table Groups is as described in Chemical And Engineering News, 63(5), 27 (1985).

"OD acidity" refers to the amount of bridged hydroxyl groups exchanged with deuterated benzene at 80° C. by Fourier transform infrared spectroscopy (FTIR). OD acidity is a measure of the Brönsted acid sites density in a catalyst.

"Acid site distribution index (ASDI)" is an indicator of the hyperactive site concentration of a zeolite. In some embodiments, the lower the ASDI the more likely the zeolite will have a greater selectivity towards the production of heavier middle distillate products.

"Amorphous silica aluminate (ASA)" refers to a synthetic material having some of the alumina present in tetrahedral coordination as shown by nuclear magnetic resonance imaging. ASA can be used as a catalyst or catalyst support. Amorphous silica alumina contains sites which are termed Brönsted acid (or protic) sites, with an ionizable hydrogen atom, and Lewis acid (aprotic), electron accepting sites and these different types of acidic site can be distinguished by the ways in which, say, pyridine attaches.

"Pseudo-boehmite alumina refers to an aluminum compound with the chemical composition AlO(OH). Pseudo-boehmite alumina consists of finely crystalline boehmite with a higher water content than boehmite "API gravity" refers to the gravity of a petroleum feedstock or product relative to water, as determined by ASTM D4052-11.

DETAILED DESCRIPTION

The distribution of the acid sites of a zeolite generally determines the catalytic activity and selectivity towards particular refining products. The ASDI provides a measurement of the super acid site concentration of a zeolite. During the commercial operation of a hydrocracking unit, higher concentrations of the hyperactive sites will lead to increased hydrocracking of the hydrocarbonaceous feedstock. The increased hydrocracking can cause increased production of lesser value products such as light naphtha and $C_1$-$C_4$ gas.

Without being bound by theory it is believed that the unique combination of the zeolite USY with total OD acidity of 0.350 to 0.650 mmol/g and an ASDI between 0.05 and 0.15, along with a suitable support and selected metal(s) provides a hydrocracking catalyst having much improved hydrocracking performance.

This new hydrocracking catalyst can give much improved selectivity for producing a hydrocracked effluent having a TBP of 250-550° F. (121-288° C.). The hydrocracking catalyst can also provide improved activity, such as from 1° F. to 30° F. (0.6° C. to 17° C.) more activity at 60% conversion compared to earlier hydrocracking catalysts that do not have the unique combination of components and properties described herein.

In one embodiment, the hydrocracking catalyst provides at least 7° F. (4° C.) more activity than a comparable hydrocracking catalyst comprising a different zeolite USY with a lower total OD acidity of at most 0.34 mmol/g.

In one embodiment, the hydrocracking catalyst has improved selectivity for producing a hydrocracked effluent having a TBP of 250-550° F. (121-288° C.) compared to a comparable hydrocracking catalyst comprising a different zeolite USY with a higher ASDI of 0.16 or greater.

Hydrocracking Catalyst Composition:

The hydrocracking catalyst comprises a zeolite USY having a total OD acidity of 0.350 to 0.650 mmol/g and an ASDI between 0.05 and 0.15.

The total OD acidity was determined by H/D exchange of acidic hydroxyl groups by FTIR spectroscopy. The method to determine the total OD acidity was adapted from the method described in the publication by Emiel J. M. Hensen et. al., J. Phys. Chem., C2010, 114, 8363-8374. Prior to FTIR measurement, the sample was heated for one hour at 400-450° C. under vacuum <1×10$^{-5}$ Torr. Then the sample was dosed with $C_6D_6$ to equilibrium at 80° C. Before and after $C_6D_6$ dosing, spectra were collected for OH and OD stretching regions. Brönsted acid sites density for zeolite USY was determined by using the integrated area of peak 2676 cm$^{-1}$ as the first high frequency OD (HF), 2653 cm$^{-1}$ as the 2nd high frequency OD (HF'), 2632 cm$^{-1}$ and 2620 cm$^{-1}$ as the first low frequency OD (LF) and 2600 cm$^{-1}$ as the 2nd low frequency OD (LF'). The total OD acidity is the sum of the various deuteroxyl site densities, in mmol/g.

ASDI is determined by H/D exchange of acidic hydroxyl groups by FTIR spectroscopy, as described previously. The ASDI was calculated by the following equation: ASDI= (HF'+LF')/(HF+LF).

In one embodiment the zeolite USY has a BET surface area greater than 600 m$^2$/g.

In one embodiment the zeolite USY has less than 40 vol % of pores greater than 2 nm.

In one embodiment the zeolite USY has a total OD acidity from 0.450 to 0.600 mmol/g, such as 0.480 to 0.580 mmol/g.

In one embodiment, the zeolite USY has a unit cell size greater than 24.15 Å, such as from 24.20 to 24.50 Å, or from 24.39 to 24.49 Å.

In one embodiment, the zeolite USY has a SAR from 5 to 50, such as from 8 to 15, or from 11 to 15. In one embodiment, the zeolite USY has a SAR greater than 10.

The amount of the zeolite USY is an amount sufficient to provide adequate hydrocracking activity. Examples of suitable amounts in a finished hydrocracking catalyst are at least 5 wt %, such as from 5 wt % to 90 wt %, greater than 10 wt %, from 11 wt % to 80 wt %, or from 12 wt % to 70 wt %.

The hydrocracking catalyst additionally comprises a support. The support is a solid with a high surface area, to which the zeolite USY is affixed. The support may be inert or participate in catalytic hydrocracking reactions. Typical supports include various kinds of carbon, alumina, and silica.

In one embodiment the support comprises an amorphous silica alumina and a second support material.

In one embodiment, the amorphous silica alumina (ASA) has greater thermal stability than high purity aluminas Examples of suitable amorphous silica aluminas are SIRAL® ASAs, described below:

TABLE 2

| Typical Properties | | SIRAL 1 | SIRAL 5 | SIRAL 10 | SIRAL 20 | SIRAL 30 | SIRAL 40 |
|---|---|---|---|---|---|---|---|
| $Al_2O_3$ + $SiO_2$ | % | 75 | 75 | 75 | 75 | 75 | 75 |
| Loss on Ignition (LOI) | % | 25 | 25 | 25 | 25 | 25 | 25 |
| $Al_2O_3$:$SiO_2$ | % | 99:1 | 95:5 | 90:10 | 80:20 | 70:30 | 60:40 |
| C | % | 0.2 | 0.2 | 0.2 | 0.2 | 0.2 | 0.2 |

TABLE 2-continued

| Typical Properties | | SIRAL 1 | SIRAL 5 | SIRAL 10 | SIRAL 20 | SIRAL 30 | SIRAL 40 |
|---|---|---|---|---|---|---|---|
| $Fe_2O_3$ | % | 0.02 | 0.02 | 0.02 | 0.02 | 0.02 | 0.02 |
| $Na_2O$ | % | 0.005 | 0.005 | 0.005 | 0.005 | 0.005 | 0.005 |
| Loose bulk density | [g/l] | 600-800 | 450-650 | 400-600 | 300-500 | 250-450 | 250-450 |
| Particle size ($d_{50}$) | [μm] | 50 | 50 | 50 | 50 | 50 | 50 |
| Surface area (BET)* | [m²/g] | 280 | 370 | 400 | 420 | 470 | 500 |
| Pore volume* | [ml/g] | 0.50 | 0.70 | 0.75 | 0.75 | 0.80 | 0.90 |

*After activation at 550° C. for 3 hours.
SIRAL ® is a registered trademark of SASOL.

Examples of the second support material can include kieselguhr, alumina, silica, and silica-alumina. Other examples of the second support material include alumina-boria, silica-alumina-magnesia, silica-alumina-titania and materials obtained by adding zeolites and other complex oxides thereto. In one embodiment, the second support material is porous, and comprises a natural clay or a synthetic oxide. The second support material can be selected to provide adequate mechanical strength and chemical stability at the reaction conditions under which the hydrocracking catalyst is employed.

In one embodiment, the second support material comprises a pseudo-boehmite alumina Examples of pseudo-boehmite alumina are CATAPAL® high purity aluminas CATAPAL® is a registered trademark of SASOL. Typical properties of the CATAPAL high purity aluminas are summarized below:

TABLE 3

| Typical Properties | CATAPAL B | CATAPAL C1 | CATAPAL D | CATAPAL 200 |
|---|---|---|---|---|
| $Al_2O_3$, wt % | 72 | 72 | 76 | 80 |
| $Na_2O$, wt % | 0.002 | 0.002 | 0.002 | 0.002 |
| Loose Bulk Density, g/l | 670-750 | 670-750 | 700-800 | 500-700 |
| Packed Bulk Density, g/l | 800-1100 | 800-1100 | 800-1100 | 700-800 |
| Average Particle size ($d_{50}$), μm | 60 | 60 | 40 | 40 |
| Surface Area* (BET), m²/g | 250 | 230 | 220 | 100 |
| Pore Volume*, ml/g | 0.50 | 0.50 | 0.55 | 0.70 |
| Crystal size, nm | 4.5 | 5.5 | 7.0 | 40 |

*Surface area and pore volume were determined after activation at 550° C. for 3 hours.

The hydrocracking catalyst additionally comprises at least one metal selected from the group consisting of elements from Group 6 and Groups 8 through 10 of the Periodic Table. In one embodiment, the hydrocracking catalyst comprises at least one Group 6 metal and at least one metal selected from Groups 8 through 10 of the Periodic Table. In one embodiment, each metal is selected from the group consisting of nickel (Ni), palladium (Pd), platinum (Pt), cobalt (Co), iron (Fe), chromium (Cr), molybdenum (Mo), tungsten (W), and mixtures thereof. In another embodiment, the hydrocracking catalyst contains at least one Group 6 metal and at least one metal selected from Groups 8 through 10 of the periodic table. Exemplary metal combinations include Ni/Mo/W, Ni/Mo, Ni/W, Co/Mo, Co/W, Co/W/Mo and Ni/Co/W/Mo.

In one embodiment, the at least one metal is a metal oxide. In one embodiment, the total amount of a metal oxide in the hydrocracking catalyst is from 0.1 wt. % to 90 wt. % based on the bulk dry weight of the finished hydrocracking catalyst. In one embodiment, the hydrocracking catalyst contains from 2 wt. % to 10 wt. % of nickel oxide and from 8 wt. % to 40 wt. % of tungsten oxide based on the bulk dry weight of the finished hydrocracking catalyst.

The hydrocracking catalyst may additionally contain one or more promoters selected from the group consisting of phosphorous (P), boron (B), fluorine (F), silicon (Si), aluminum (Al), zinc (Zn), manganese (Mn), and mixtures thereof. The amount of promoter in the hydrocracking catalyst can be from 0 wt. % to 10 wt. % based on the bulk dry weight of the finished hydrocracking catalyst. In one embodiment, the amount of promoter in the hydrocracking catalyst is from 0.1 wt. % to 5 wt. % based on the bulk dry weight of the finished hydrocracking catalyst.

In one embodiment, the hydrocracking catalyst is in the form of extruded pellets (extrudates) that have an extruded pellet diameter of 10 mm or less, such as from 1.0 to 5.0 mm. In one embodiment, the extruded pellet has a length-to-diameter ratio of 10 to 1. Examples of other types and sizes of pellets used for the hydrocracking catalysts are 1 to 10 mm diameter spheres; 1 to 10 mm diameter cylinders with a length-to-diameter ratio of 4 to 1; 1 to 10 mm asymmetric shapes (including quadrolobes), and up to 10 mm diameter hollow cylinders or rings.

Hydrocracking Catalyst Preparation

One method for making the hydrocracking catalyst comprises:

a. mixing together a zeolite USY having a total OD acidity of 0.350 to 0.650 mmol/g and an ASDI between 0.05 and 0.15; one or more support constituents; and enough liquid to form an extrudable paste;

b. extruding the extrudable paste to form an extrudate base;

c. impregnating the extrudate base with a metal impregnation solution containing at least one metal selected from the group consisting of elements from Group 6 and Group 8 through 10 of the Periodic Table to make a metal-loaded extrudate; and d. post-treating the metal-loaded extrudate by subjecting the metal-loaded extrudate to drying and calcination.

The liquid used in step a) can be water or a mild acid. In one embodiment the liquid used in step a) is a diluted $HNO_3$ acid aqueous solution with from 0.5 to 5 wt % $HNO_3$.

Prior to the impregnating step c), the extrudate base can be dried at a temperature between 90° C. (194° F.) and 150° C. (302° F.) for 30 minutes to 3 hours. The dried extrudate base can then be calcined at one or more temperatures between 350° C. (662° F.) and 700° C. (1292° F.).

In one embodiment, the metal impregnation solution is made by dissolving metal precursors in a solvent. Suitable solvents include water, $C_1$-$C_3$ alcohols, ethers, and amines. In one embodiment, the solvent is deionized water. In one embodiment, the metal impregnation solution is adjusted to a basic pH, such as a basic pH greater than 8. In one embodiment, the metal impregnation solution has a basic pH from 9.2 to 9.5. The concentration of the metal impregnation solution can be determined by the pore volume of the support and by the selected metal loading. In one embodiment, the extrudate base is exposed to the metal impregnation solution for 0.1 to 24 hours. If the hydrocracking catalyst comprises two or more metals, these metals can be impregnated sequentially or simultaneously.

In one embodiment, impregnation of at least one of the metals is achieved in the presence of a modifying agent that can be selected from the group consisting of compounds represented by structures (1) through (4), including condensated forms thereof:

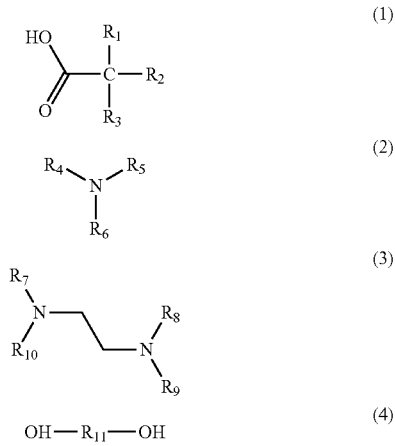

wherein:

(1) $R_1$, $R_2$ and $R_3$ are independently selected from the group consisting of hydrogen; hydroxyl; methyl; amine; and linear or branched, substituted or unsubstituted C1-C3 alkyl groups, C1-C3 alkenyl groups, C1-C3 hydroxyalkyl groups, C1-C3 alkoxyalkyl groups, C1-C3 aminoalkyl groups, C1-C3 oxoalkyl groups, C1-C3 carboxyalkyl groups, C1-C3 aminocarboxyalkyl groups and C1-C3 hydroxycarboxyalkyl groups;

(2) $R_4$ through $R_{10}$ are independently selected from the group consisting of hydrogen; hydroxyl; and linear or branched, substituted or unsubstituted C2-C3 carboxyalkyl groups; and (3) $R_{11}$ is selected from the group consisting of linear or branched, saturated and unsaturated, substituted or unsubstituted C1-C3 alkyl groups, C1-C3 hydroxyalkyl groups, and C1-C3 oxoalkyl groups.

Representative examples of modifying agents useful in this embodiment include 2,3-dihydroxy-succinic acid, ethanedioic acid, 2-hydroxyacetic acid, 2-hydroxy-propanoic acid, 2-hydroxy-1,2,3-propanetricarboxylic acid, methoxyacetic acid, cis-1,2-ethylene dicarboxylic acid, hydroethane-1,2-dicarboxyic acid, ethane-1,2-diol, propane-1,2,3-triol, propanedioic acid, and α-hydro-ω-hydroxypoly(oxyethylene).

In an alternate embodiment, deposition of at least one of the metals is achieved in the presence of a modifying agent selected from the group consisting of N,N'-bis(2-aminoethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, and quinoline.

When used, the modifying agent can impede metal aggregation, thereby enhancing the activity and selectivity of the catalyst.

For each embodiment described herein, the amount of modifying agent in the pre-calcined hydrocracking catalyst can be from 0 wt % to 18 wt % based on the bulk dry weight of the hydrocracking catalyst.

In one embodiment, the metal impregnation solution can additionally comprise a peptizing agent. Examples of peptizing agents are organic acids such as pyruvic acid, levulinic acid, acetic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, citric acid, 5-oxo pentanoic acid, 4-oxo pentanoic acid, formic acid, propionic acid, butyric acid, valeric acid, caproic acid, enantic acid, caprylic acid, pelargonic acid, capric acid, undecylic acid, lauric acid, tridecylic acid, benzoic acid, salicylic acid, glutaric acid, adipic acid, pimelic acid, azelaic acid, phtalic acid, isophtalic acid, lactic acid, ethyl glyoxylate, glycolic acid, glucose, glycine, oxamic acid, glyoxylic acid, ethylenediaminetetraacetic acid (EDTA), nitrilotriacetic acid, N-methylaminodiacetic acid, iminodiacetic acid, diglycolic acid, malic acid, gluconic acid, acetylacetone, tartaric acid, aconitic acid, suberic acid, tricarballylic acid, malonic acid, succinic acid, and glycolic acid.

In one embodiment the metal-loaded extrudate is dried at one or more temperatures in the range of 38° C. (100° F.) to 177° C. (350° F.) for 0.1 to 10 hours. The dried metal-loaded extrudate can be further calcined at one or more temperatures from 316° C. (600° F.) to 649° C. (1200° F.), with purging excess dry air, for 0.1 to 10 hours.

Hydrocracking Overview

In one embodiment, the hydrocracking catalyst has an improved property compared to a comparable hydrocracking catalyst comprising a different zeolite USY with a lower OD acidity of at most 0.34 mmol/g or a higher ASDI of 0.16 or greater. The improved property can be selected from the group of: i.) a higher selectivity for producing a hydrocracked effluent having a TBP of 250-550° F. (121-288° C.), ii.) an activity that is 7° F. (4° C.) to 30° F. (17° C.) higher, and iii.) combinations thereof. The hydrocracking catalyst can be used to hydrocrack a broad variety of hydrocarbonaceous feedstocks. Examples of hydrocarbonaceous feedstocks include those that could be considered disadvantaged feedstocks that would not normally be conducive for making a hydrocracked effluent that is a middle distillate, especially a middle distillate having a TBP of 250-550° F. (121-288° C.), using a conventional one- or two-stage hydrocracking process. Suitable hydrocarbonaceous feedstocks that can be used can include visbroken gas oils, heavy coker gas oils, gas oils derived from residue hydrocracking or residue desulfurization, other thermally cracked oils, de-asphalted oils, Fischer-Tropsch derived feedstocks, cycle oils from a fluid catalytic cracking (FCC) unit, heavy coal-derived distillates, coal gasification byproduct tars, heavy shale-derived oils, organic waste oils such as those from pulp or paper mills or from waste biomass pyrolysis units.

Table 4 lists some typical physical properties for a hydrocarbonaceous feedstock that can be used.

TABLE 4

| Property | |
|---|---|
| API Gravity | 13.5-30.0 |
| N, ppm | 0.5-2,000 |
| S, wt % | 0-5 |
| Polycyclic Index (PCI) | 1500-8000 |
| TBP Range, °F. (°C.) | 700-1200° F. (371-649° C.) |

Table 5 lists some typical hydrocracking process conditions that can be used.

TABLE 5

| Property | |
|---|---|
| Liquid Hourly Space Velocity (LHSV), hr$^{-1}$ | 0.1-5 |
| H$_2$ partial pressure, psig (kPa) | 800-3,500 (5516-24,132) |
| H$_2$ Consumption Rate, SCF/B | 200-20,000 |
| H$_2$ Recirculation Rate, SCF/B | 50-5,000 |
| Operating Temperature | 200-450° C. (392-842° F.) |
| Conversion (wt %) | 30-90 |

Depending on the feedstock, target product slate and amount of available hydrogen, the catalyst described herein can be used alone or in combination with other conventional hydrocracking catalysts.

In one embodiment, the catalyst is deployed in one or more fixed beds in a single stage hydrocracking unit, with or without recycle (once-through). Optionally, the single-stage hydrocracking unit may employ multiple single-stage units operated in parallel.

In one embodiment, the catalyst is deployed in one or more beds or units in a two-stage hydrocracking unit, with and without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

In one embodiment, the catalyst is used in the first stage and optionally the second stage of a partial conversion, two-stage hydrocracking configuration which is well suited for making at least one middle distillate and a heavy vacuum gas fluidized catalytic cracking feedstock (HVGO FCC), by:

(a) hydrocracking a hydrocarbonaceous feedstock to produce a first stage hydrocracked effluent;

(b) distilling the hydrocracked feedstock by atmospheric distillation to form at least one middle distillate fraction and an atmospheric bottoms fraction;

(c) further distilling the atmospheric bottoms fraction by vacuum distillation to form a side-cut vacuum gas oil fraction and a heavy vacuum gas oil FCC feedstock;

(d) hydrocracking the side-cut vacuum gas oil fraction to form a second stage hydrocracked effluent; and (e) combining the second stage hydrocracked effluent with the first stage hydrocracked effluent.

The refinery configuration illustrated above has several advantages over conventional two-stage hydrocracking schemes. First, in this configuration, the catalyst and operating conditions of the first stage are selected to yield a HVGO FCC stream having only the minimum feed qualities necessary to produce FCC products which meet the established commercial specifications. This is in contrast to a conventional two-stage hydrocracking scheme where the first stage hydrocracking unit is operated at a severity necessary to maximize distillate yield which, in turn, requires the unit to be operated at more severe conditions (which requires more hydrogen and reduces the life of the catalyst).

Second, in this optional configuration, the side-cut vacuum gas oil (VGO) sent to the second stage hydrocracker unit is cleaner and easier to hydrocrack than a conventional second stage hydrocracker feed. Therefore, higher quality middle distillate products can be achieved using a smaller volume of second stage hydrocracking catalyst which, in turn, allows for the construction of a smaller hydrocracker reactor and consumption of less hydrogen. The second stage hydrocracking unit configuration reduces construction cost, lowers catalyst fill cost and operating cost.

EXAMPLES

Example 1

Preparation of Comparative Catalyst Sample B1

Comparative catalyst sample B1 was prepared by combining 56.4 wt % sample A1 USY zeolite, 21 wt % amorphous silica alumina (ASA) powder, and 22.6 wt % pseudo-boehmite alumina; and mixing them well.

The sample A1 USY zeolite had an acid site distribution index (ASDI) of 0.16. Additional properties of the sample A1 USY zeolite are summarized in Table 6.

TABLE 6

| SAR | 30 |
|---|---|
| Unit Cell Size, Å | 24.28 |
| Brönsted acid sites determined by FTIR after H/D exchange (mmol/g) | |
| HF(OD) | 0.173 |
| HF'(OD) | 0.034 |
| LF(OD) | 0.096 |
| LF'(OD) | 0.008 |
| Total OD Acidity, mmol/g | 0.311 |
| ASDI | 0.16 |

Unit cell size can be measured by ASTM D3942-03 (Reapproved 2013) "Standard Test Method for Determination of the Unit Cell Dimension of a Faujasite-Type Zeolite".

The ASA powder was Siral-40 obtained from Sasol. The pseudo-boehmite alumina was CATAPAL B from Sasol.

To this mixture described above, a diluted HNO$_3$ acid aqueous solution (3 wt %) was added to form an extrudable paste. The extrudable paste was extruded into a 1/16" (1.59 mm) asymmetric quadrolobe shape, and dried at 248° F. (120° C.) for 1 hour. The dried extrudates were calcined at 1100° F. (593° C.) for 1 hour with purging excess dry air, and cooled down to room temperature.

Ni and W were impregnated onto the dried extruded catalyst using a solution containing ammonium metatungstate and nickel nitrate at concentrations to achieve the target metal loadings of 3.8 wt % NiO and 25.3 wt % $WO_3$, based on the bulk dry weight of the finished catalyst. The metal impregnated extruded catalyst was dried at 270° F. (132° C.) for 1 hour. The dried catalyst was then calcined at 950° F. (510° C.) for 1 hour with purging excess dry air, and cooled down to room temperature. The composition of this finished comparative catalyst sample B1 is shown in Table 8.

Example 2

Preparation of Catalyst Sample B2

Catalyst sample B2 was prepared similar to the process described in Example 1 except that 56.4 wt % of sample A2 USY zeolite was used in place of the A1 USY zeolite. The sample A2 USY zeolite had an acid site distribution index (ASDI) of 0.13. Additional properties of the sample A1 USY zeolite are summarized in Table 7.

TABLE 7

| | |
|---|---|
| SAR | 11 |
| Unit Cell Size, Å | 24.39 |
| BET Surface Area, m²/g | 727 |
| Pores > 2 nm/total pores, vol % | 40 |
| Brönsted acid sites determined by FTIR after H/D exchange (mmol/g) | |
| HF(OD) | 0.293 |
| HF'(OD) | 0.036 |
| LF(OD) | 0.173 |
| LF'(OD) | 0.025 |
| Total OD Acidity, mmol/g | 0.527 |
| ASDI | 0.13 |

BET surface area was determined by ASTM D4365-13 "Standard Test Method for Determining Micropore Volume and Zeolite Area of a Catalyst" using nitrogen adsorption at five points in the linear BET range. The $P/P_0$ values used were 0.05, 0.09, 0.14, 0.17, and 0.20. The sample was pretreated and outgassed at 400° C. with dry nitrogen flow for about 24 hours.

Pores >2 nm/total pores, in vol %, was measured and calculated by ASTM D4222-03 (Reapproved 2008) "Determination of Nitrogen Adsorption and Desorption Isotherms of Catalysts and Catalyst Carriers by Static Volumetric Measurements"; ASTM D4641-12 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; Journal of American Chemical Society; vol. 73, pp. 373-380 (1951). The sample was pretreated and outgassed at 400° C. with dry nitrogen flow for about 24 hours. The composition of this finished catalyst sample B2 is shown in Table 8.

TABLE 8

Catalyst Compositions

| Catalyst Component | Comparative Catalyst Sample B1 | Catalyst Sample B2 |
|---|---|---|
| A1 USY Zeolite | 40.0 | 0 |
| A2 USY Zeolite | 0 | 40.0 |
| NiO, wt % | 3.8 | 3.8 |
| $WO_3$, wt % | 25.3 | 25.3 |

Example 3

Comparison of Catalyst Performance

The two sample catalysts described above were used to process a typical Middle Eastern VGO feedstock.
The properties of this feedstock are described in Table 9.

TABLE 9

| | |
|---|---|
| API Gravity | 21 |
| N, ppm | 1140 |
| S, wt % | 2.3 |
| Polycyclic Index (PCI) | 2333 |
| TBP Range, ° F. (° C.) | |
| 5 | 708 (376) |
| 10 | 742 (394) |
| 30 | 810 (432) |
| 50 | 861 (461) |
| 70 | 913 (489) |
| 90 | 981 (527) |
| 95 | 1008 (542) |
| Entire Product | 1069 (576) |

The hydrocracking runs were operated in a pilot plant under 2300 psig (18,858 kPa) total pressure, 1.0 to 2.0 LHSV, and 5000 SCF/B once through hydrogen gas. The yields were determined at 60% synthetic conversion. The test results are summarized below in Table 10.

TABLE 10

| | Comparative Catalyst Sample B1 Base Case | Catalyst Sample B2 |
|---|---|---|
| CAT, ° F. (60% conv.) | base | −19 |
| Yields Compared to Comparative Base Case, by cut point | | |
| 180-250° F., vol % | base | 0.4 |
| 250-550° F., vol % | base | 1.7 |
| 550-700° F., vol % | base | −0.6 |

The catalyst sample B2 gave a significant improvement in jet yield compared to the comparative catalyst sample B1. Additionally, the catalyst sample B2 was 19° F. more active.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A hydrocracking catalyst for making middle distillates comprising:
    a. greater than 10 wt % of a zeolite USY having:
        i. a total OD acidity of 0.350 to 0.650 mmol/g;
        ii. an ASDI between 0.05 and 0.15;
        iii. a BET surface area greater than 600 m$^2$/g;
        iv. a SAR greater than 10;
        v. less than 45 vol % of pores greater than 2 nm;
    b. a support; and
    c. at least one metal selected from the group consisting of elements from Group 6 and Groups 8 through 10 of the Periodic Table;
wherein the OD acidity and the ASDI are determined by H/D exchange of acidic hydroxyl groups at equilibrium at 80° C. by FTIR spectroscopy.

2. The hydrocracking catalyst of claim 1, wherein the hydrocracking catalyst has at least 7° F. (4° C.) more activity than a comparable hydrocracking catalyst comprising a different zeolite USY with a lower total OD acidity of at most 0.34 mmol/g.

3. The hydrocracking catalyst of claim 1, wherein the total OD acidity is from 0.450 to 0.600 mmol/g.

4. The hydrocracking catalyst of claim 1, wherein the zeolite USY has a unit cell size from 24.20 to 24.50 Å.

5. The hydrocracking catalyst of claim 4, wherein the unit cell size is from 24.39 to 24.49 Å.

6. The hydrocracking catalyst of claim 1, wherein an amount of the zeolite USY is from 11 wt % to 80 wt % in a finished hydrocracking catalyst.

7. The hydrocracking catalyst of claim 1, wherein the zeolite USY has a SAR from 5 to 29.

8. The hydrocracking catalyst of claim 7, wherein the SAR is from 11 to 15.

9. The hydrocracking catalyst of claim 1, wherein the zeolite USY has less than 40 vol % of pores greater than 2 nm.

10. The hydrocracking catalyst of claim 1, comprising at least one Group 6 metal and the at least one metal selected from Groups 8 through 10 of the Periodic Table.

11. A process for hydrocracking a hydrocarbonaceous feedstock, comprising contacting the hydrocarbonaceous feedstock with the hydrocracking catalyst of claim 1 under hydrocracking conditions to produce a hydrocracked effluent that comprises middle distillates.

12. The process of claim 11, wherein the hydrocracking catalyst is at least 7° F. more active than a comparable hydrocracking catalyst comprising a different zeolite USY with a lower total OD acidity of at most 0.34 mmol/g.

13. The process of claim 11, wherein the total OD acidity is from 0.450 to 0.600 mmol/g.

14. The process of claim 11, wherein the zeolite USY has a unit cell size from 24.20 to 24.50 Å.

15. The process of claim 11, wherein an amount of the zeolite USY is from 11 wt % to 80 wt % in a finished hydrocracking catalyst used for the contacting.

16. The process of claim 11, wherein the zeolite USY has a SAR from 5 to 29.

17. The process of claim 11, wherein the hydrocracking catalyst comprises at least one Group 6 metal and at the at least one metal selected from Groups 8 through 10 of the Periodic Table.

18. The process of claim 11, wherein the hydrocarbonaceous feedstock has a TBP range within 700 to 1200° F. (371 to 649° C.).

19. The process of claim 11, wherein the hydrocracked effluent comprises from 20 vol % to 50 vol % of a middle distillate having a TBP of 250-550° F. (121-288° C.).

* * * * *